United States Patent
Behr (10) Patent No.: US 7,281,754 B2
(45) Date of Patent: Oct. 16, 2007

(54) FLEXIBLE PANEL SYSTEM

(76) Inventor: Eugene E. Behr, 2226 Highland Ct., Grand Forks, ND (US) 58201

( * ) Notice: Subject to any disclaimer, the term of this patent is extended or adjusted under 35 U.S.C. 154(b) by 294 days.

(21) Appl. No.: 11/042,763

(22) Filed: Jan. 24, 2005

(65) Prior Publication Data

US 2006/0163910 A1    Jul. 27, 2006

(51) Int. Cl.
*B62D 29/00* (2006.01)
(52) U.S. Cl. ............................. 296/181.1; 296/181.2; 296/191; 264/258; 264/324; 442/180
(58) Field of Classification Search ............ 296/181.2, 296/181.1, 187.03, 191, 901.01; 264/258, 264/324; 442/64, 180
See application file for complete search history.

(56) References Cited

U.S. PATENT DOCUMENTS

| | | | |
|---|---|---|---|
| 4,411,939 A * | 10/1983 | Hawkins et al. ............... 428/58 |
| 4,705,716 A * | 11/1987 | Tang .......................... 442/224 |
| 4,764,238 A * | 8/1988 | Dastin et al. ................. 156/245 |
| 5,895,699 A * | 4/1999 | Corbett et al. ............... 428/116 |
| 6,187,411 B1 * | 2/2001 | Palmer ........................ 428/102 |
| 6,214,753 B1 * | 4/2001 | Brenot et al. ................ 442/225 |
| 6,296,301 B1 * | 10/2001 | Schroeder et al. ........ 296/187.02 |
| 6,460,838 B1 * | 10/2002 | Bradley et al. .............. 267/149 |
| 6,756,090 B1 * | 6/2004 | Westerlund ................ 428/34.1 |
| 6,971,650 B2 * | 12/2005 | Marelja ..................... 296/181.1 |
| 2001/0012553 A1 * | 8/2001 | Marion ........................ 428/99 |
| 2005/0051262 A1 * | 3/2005 | Erickson et al. ............ 156/245 |
| 2005/0140177 A1 * | 6/2005 | Montagna et al. .......... 296/191 |
| 2005/0255311 A1 * | 11/2005 | Formella ..................... 428/323 |
| 2005/0264039 A1 * | 12/2005 | Steinhauser et al. ........ 296/191 |
| 2006/0172121 A1 * | 8/2006 | Lee et al. .................... 428/178 |

* cited by examiner

*Primary Examiner*—Jason S Morrow
(74) *Attorney, Agent, or Firm*—Robert D. Atkins; Quarles & Brady LLP (57) ABSTRACT

A racing vehicle has a plurality of molded body panels. Certain ones of the molded body panels are made with pre-impregnated filler reinforced fiberglass material. A first layer of pre-impregnated fiberglass material is formed to the panel shape. A second layer of pre-impregnated fiberglass material is formed in physical contact with the first layer of fiberglass material. A first filler layer is disposed between and in physical contact with the first and second layers of fiberglass material. A third layer of pre-impregnated fiberglass material is formed in physical contact with the second layer of fiberglass material. A second filler layer is disposed between and in physical contact with the second and third layers of fiberglass material. A foam core is disposed between and in physical contact with the second and third layers of fiberglass material. The molded body panel is connected to the racing vehicle with spring steel rods.

23 Claims, 5 Drawing Sheets

FLEXIBLE PANEL SYSTEM

FIELD OF THE INVENTION

The present invention relates in general to protective body panels for vehicles and, more particularly, to a flexible panel system for vehicles subject to high probability of collision.

BACKGROUND OF THE INVENTION

Many people enjoy the thrill and excitement of amateur and professional racing. The speed of the racers and skill of the drivers is something special to behold. Racing is typically conducted on an oval track. The racers proceed in a counterclockwise rotation around the track, which may be ¼ mile to ½ mile or longer in length. Racing is a highly competitive sport. By its very nature, the speed of the racers far exceeds normal public driving habits. The drivers will do whatever they can, within the rules, to gain an advantage over their competitors. The competitive nature of the sport necessarily involves driving in close proximity, and passing with minimal clearance, with respect to other racers, at speeds commonly exceeding 100 miles per hour (MPH). In some racing venues, the speeds can exceed 200 MPH. Given the small area of the race track, drivers are often driving at high speed within feet or inches of other racers or the protective wall between the track and the spectators. Physical contact with other racers or the protective wall is at times unavoidable and an inherent part of the sport. The collision may involve a bump between door panels of side by side racers, or a front fender to rear quarter panel clip. The racer may suffer a glancing blow to the protective wall while rounding a turn. In any case, the impact is likely to cause damage to the body of the race vehicle.

The race vehicle comes in a variety of designs and structures. In dirt track racing, the engine, drive train, and driver compartment are contained within or mounted to a chassis or frame assembly. A sheet metal body is formed with a series of panels which are mounted to the frame assembly. Each body panel is connected to the frame assembly with a number of rods or struts. The body panels having a thickness of about 0.032 inches are typically made of aluminum, which is known for its light weight properties and relative low cost.

In the event that the dirt track racer comes in physical contact with another vehicle or other structure during the race, the aluminum body panels will bend or buckle upon impact. The deformations in the metal body panels remain after the collision. Depending on the severity of the collision and its effect on the performance of the racer, the driver may need to make a pit stop to bend the panel back to a functional position or remove the damaged panel completely in order to finish the race. There is very little time in the pit during the race to make adjustments to the damaged area.

Finishing the race with a damaged or missing body panel is a disadvantage for the race team. The damaged or missing body panel can effect the aerodynamic performance of the racer. With the neutralizing rules on racer configuration, such disadvantages can make the difference in the racer's finishing position. Moreover, the damaged panel is less likely to effectively absorb another impact which reduces the protection for the chassis and safety factor to the driver. Finally, racers rely to a significant degree on sponsorships for their financial viability. The racer body is a prime medium for advertisers. A damaged or missing panel interferes with the view of sponsorship logos and advertisements. Sponsors have been known to reduce payments or pull their endorsements entirely for poor presentation, i.e., failure to maintain the racer body in presentable condition to clearly display the sponsor's message in a visually appealing manner.

After the race, the crew must remove the effected body panels and bang out the dents or replace the damaged areas completely. Even when time permits to attempt to reform the body panels, the crew is rarely if ever successful in retuning the damaged body panel to its original form and shape. A metal surface that has been deformed never returns to its original form, at least not without using sophisticated metallurgy tools and processes, which are usually not available on the racing scene. Some evidence of the deformed metal remains. More than likely, the collision also damages the panel support rods to the frame assembly which must also be repaired or replaced. The time and materials used to repair the racer body panels is costly to the race team.

A need exists for body panels on vehicles which are subject to high probability of collisions that do not sustain permanent damage or deformation during impact.

SUMMARY OF THE INVENTION

In one embodiment, the present invention is a body panel for a racing vehicle comprising a first layer of pre-impregnated fiberglass material. A second layer of pre-impregnated fiberglass material is formed in physical contact with portions of the first layer of pre-impregnated fiberglass material. A first filler layer is disposed between and in physical contact with the first and second layers of pre-impregnated fiberglass material. A third layer of pre-impregnated fiberglass material is formed in physical contact with portions of the second layer of pre-impregnated fiberglass material. A second filler layer is disposed between and in physical contact with the second and third layers of pre-impregnated fiberglass material.

In another embodiment, the present invention is a molded body panel which is subject to frequent impact comprising a first layer of pre-impregnated fiberglass material. A second layer of pre-impregnated fiberglass material is formed in physical contact with portions of the first layer of pre-impregnated fiberglass material. A first filler layer is disposed between and in physical contact with the first and second layers of pre-impregnated fiberglass material.

In another embodiment, the present invention is a method of making a flexible body panel comprising forming a first layer of pre-impregnated fiberglass material, forming a second layer of pre-impregnated fiberglass material in physical contact with portions of the first layer of pre-impregnated fiberglass material, and disposing a first filler layer between and in physical contact with the first and second layers of pre-impregnated fiberglass material.

In another embodiment, the present invention is a racing vehicle having a plurality of molded body panels. At least one of the molded body panels includes a first layer of pre-impregnated fiberglass material. A second layer of pre-impregnated fiberglass material is formed in physical contact with portions of the first layer of pre-impregnated fiberglass material. A first filler layer is disposed between and in physical contact with the first and second layers of pre-impregnated fiberglass material.

DETAILED DESCRIPTION OF THE DRAWINGS

The present invention is described in one or more embodiments in the following description with reference to the Figures, in which like numerals represent the same or similar elements. While the invention is described in terms of the best mode for achieving the invention's objectives, it will be appreciated by those skilled in the art that it is intended to cover alternatives, modifications, and equivalents as may be included within the spirit and scope of the invention as defined by the appended claims and their equivalents as supported by the following disclosure and drawings.

Figure 1:
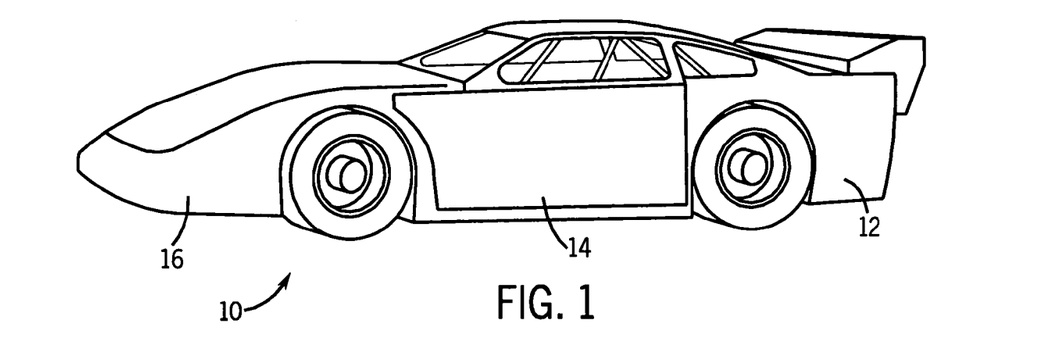
FIG. 1 illustrates a dirt track racer with body panels surrounding the frame assembly.

Referring to FIG. 1, a dirt track racer 10 has a chassis or frame assembly for structural support of the engine, drive train, and driver compartment. A plurality of body panels, including rear quarter body panel 12, door body panel 14, and front fender body panel 16 are mounted to the frame assembly. The body panels provide protection for the frame assembly and a safety factor for the driver. The body panels are functional in providing aerodynamic performance for racer 10, as well as mounting surfaces for sponsorship logos. The form, color, and appearance of the body panels add to the aesthetic appeal of racer 10 to promote the sport of dirt track racing.

Figure 2:
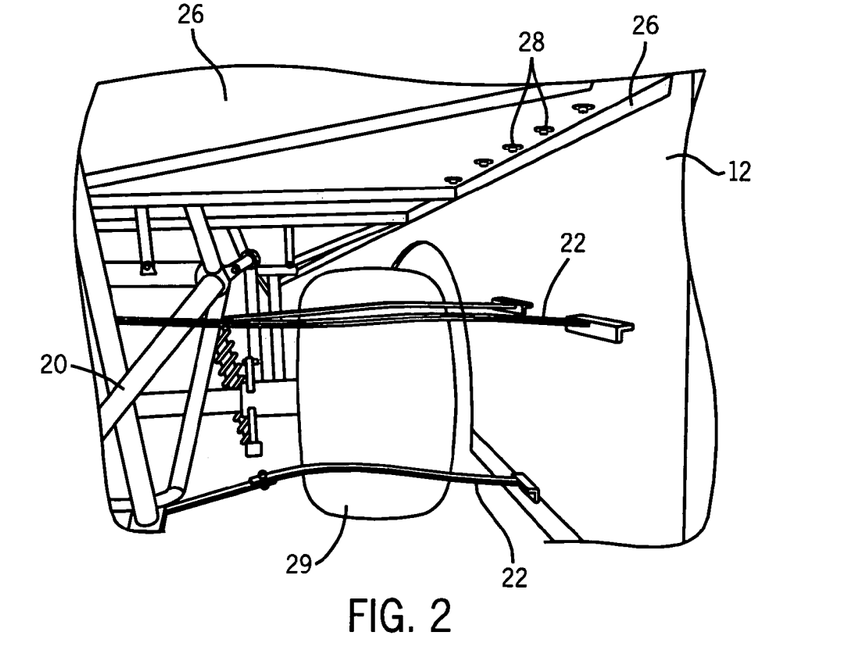
FIG. 2 illustrates an interior view of the rear quarter panel mounted to the frame assembly.

An interior view of racer 10 is shown in FIG. 2 as the back side of rear quarter body panel 12. Rear quarter panel 12 is mounted to frame assembly 20 with spring steel rods or struts 22. The spring steel rods 22 allow for deflection of the lower body panel. The spring steel rods help the body panel to flex inward and outward in response to an external force. The top portion of panel 12 is secured to deck 26 running along the top of frame assembly 20 with bolts, screws, rivets, or other fasteners 28. The spring steel rods 22 are typically 18-24 inches in length to hold panel 12 off wheel 29.

Figure 3:
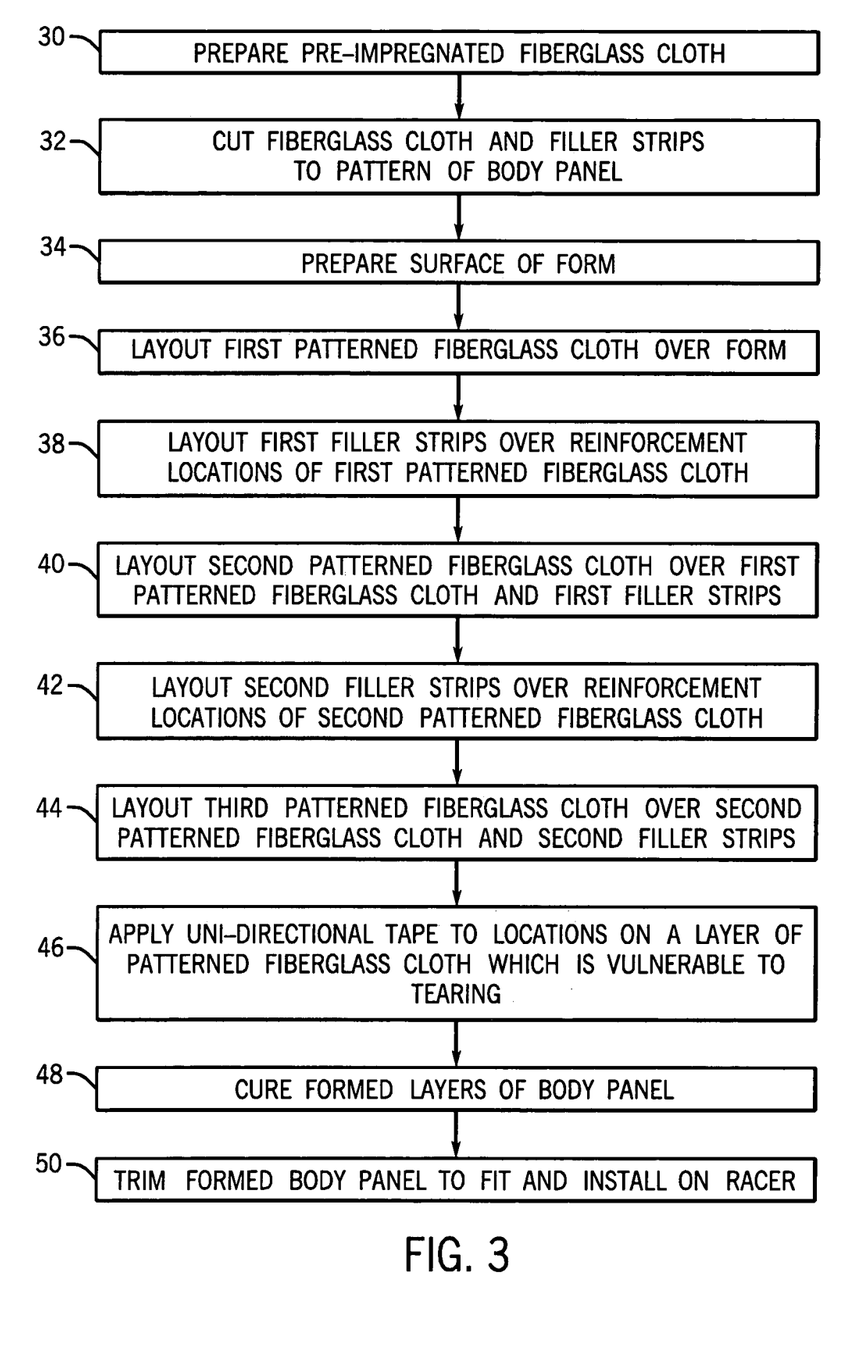
FIG. 3 illustrates the steps of forming the body panel.

The body panels of racer 10 can be formed to a variety of form factors. Body panels 12, 14, and 16 may each have a different form and reinforcement structure. FIG. 3 illustrates the basic process of fabricating a body panel. The process begins with pre-impregnated dual weave fiberglass cloth material, which is available in 50-inch wide rolls of material ranging from 100-750 feet in length. The fiberglass cloth material is pre-impregnated with an epoxy based resin in a semi-solid state, which makes the cloth flexible. In one embodiment, the pre-impregnated fiberglass cloth is E-Glass 7781 available from Bryte Technologies.

In step 30, the pre-impregnated fiberglass cloth is prepared for the mold or form of the body panel to be formed. The pre-impregnated fiberglass cloth is stored in a frozen state, e.g., 10 degrees Fahrenheit (F), for maximum shelf life. When ready for use, the fiberglass cloth is allowed to thaw to room temperature over a period of 36-72 hours, which gives it a pliable, flexible property. The pre-impregnated fiberglass cloth material is about 0.010 inch in thickness.

In step 32, the fiberglass cloth material is cut to the pattern of the body panel. In one embodiment, a total of three patterns of the body panel are cut, two patterns having a common glass orientation, and one having an opposite glass orientation with respect to the first two patterns. A number of filler materials or strips, made with the same E-Glass 7781 pre-impregnated dual weave fiberglass cloth material, are also cut to the proper dimensions, e.g., 4-inch strips of varying length. The filler strips may also be made with carbon fiber. The filler strips are used to reinforce and strengthen the body panel as described below. The dimensions of the body panel and filler strips can be determined by a template or measured directly. Alternatively, the pattern proportions of the body panel and filler strips is stored in a computer controlled cutting tool which precisely cuts the fiberglass cloth material to the programmed dimensions and form.

In step 34, the surface of the form or mold for the body panel is prepared. For example, the form of rear quarter body panel 12 is a horizontal flat surface or table top with a 90 degree seamless vertical 4-inch lip on one side of the form surface. In other embodiments, the mold surface may conform to any shape or form factor. For example, the mold surface may be angled or curved. Before the fiberglass cloth is laid out, a blue high temperature release film is applied to the form or mold surface. The release film prevents the fiberglass material from adhering to the form surface and aids in removing the final body panel from the form surface at the end of the fabrication process.

In step 36, a first patterned fiberglass cloth layer having the first direction of glass orientation is laid out and conforms to the form or mold surface, e.g., continuous from the horizontal flat surface through the 90 degree bend to the vertical lip.

In step 38, a first number of filler strip layers are laid out at predefined reinforcement locations over the surface of the first patterned fiberglass cloth. The first filler strips may be applied in multiple overlapping layers to the first patterned fiberglass cloth. The first filler strips are pressed against or rubbed into the first patterned fiberglass cloth to remove any air pockets. The first filler strips will be in physical contact with the first patterned fiberglass cloth.

In step 40, a second patterned fiberglass cloth layer having the second direction of glass orientation, opposite or perpendicular to the first direction of glass orientation, is laid out and conforms to the form surface, e.g., continuous from the horizontal flat surface through the 90 degree bend to the vertical lip. The second patterned fiberglass cloth is pressed against or rubbed into the first patterned fiberglass cloth and first filler strips to remove any air pockets. The second patterned fiberglass cloth will be in physical contact with first filler strips and portions of the first patterned fiberglass cloth.

In step 42, a second number of filler strip layers are laid out at predefined reinforcement locations over the surface of the second patterned fiberglass cloth. The second filler strips may be applied in multiple overlapping layers to the second patterned fiberglass cloth. The second filler strips are pressed against or rubbed into the second patterned fiberglass cloth to remove any air pockets. The second filler strips will be in physical contact with the second patterned fiberglass cloth.

In step 44, a third patterned fiberglass cloth having the first direction of glass orientation is laid out and conforms to the form surface, e.g., continuous from the horizontal flat surface through the 90 degree bend to the vertical lip. The third patterned fiberglass cloth is pressed against or rubbed into the second patterned fiberglass cloth and second filler strips to remove any air pockets. The third patterned fiberglass cloth will be in physical contact with the second filler strips and portions of the second patterned fiberglass cloth.

In some cases, the filler strips can be formed in one or more layers to just one surface of the patterned fiberglass cloth. For example, multiple filler strip layers may be formed to the inside edge of the 90 degree bend of rear quarter body panel 12. In addition, the filler strips can be formed in multiple layers between the patterned fiberglass cloth layers.

In step 46, an S-Glass uni-directional tape with silk veil is applied to specific locations on the third patterned fiberglass cloth. Alternatively, the uni-directional tape can be disposed between the second and third patterned fiberglass cloth layers. The uni-directional tape reduces the potential of tearing at vulnerable locations of the body panel.

In step 48, the formed layers of the body panel are cured. Another layer of release film is applied to the third patterned fiberglass cloth, again to prevent adherence to the fiberglass cloth. An N7 fibrous breather material is applied over the release film. A high temperature double side sealant tape is put down around the perimeter of the formed body panel. The entire formed layers of the body panel are covered or enclosed with a vacuum bagging film canopy secured to the sealant tape. A vacuum pump is attached to a vacuum port on the vacuum bagging film. The vacuum pump draws air from under the bagging film, e.g., to about 26 inches hg, which compresses the breather material against the formed body panel. The fiberglass materials are pressed against the form surface to hold the entire formed structure tightly together for the curing process.

The formed fiberglass body panel is cured with infrared heat while still under vacuum. Alternatively, the heat source may be gas or electric oven. The fiberglass material increases in temperature at a rate of 1-4° F. per minute. The temperature increases to 180° F. and held for 30-45 minutes. The temperature is then increased at the same rate to 260° F. and held for up to 1 hour. The heat source is removed and the fiberglass is allowed to cool to 150° F. The vacuum is released and the bagging film is removed. The resultantly formed body panel is a three-ply laminated structure with reinforcing filler strips interposed between the individual fiberglass plies.

In step 50, the formed body panel is trimmed to fit racer 10. The edges are cut square, and the wheel well is cut out. The body panel is ready for installation on racer 10.

Figure 4:
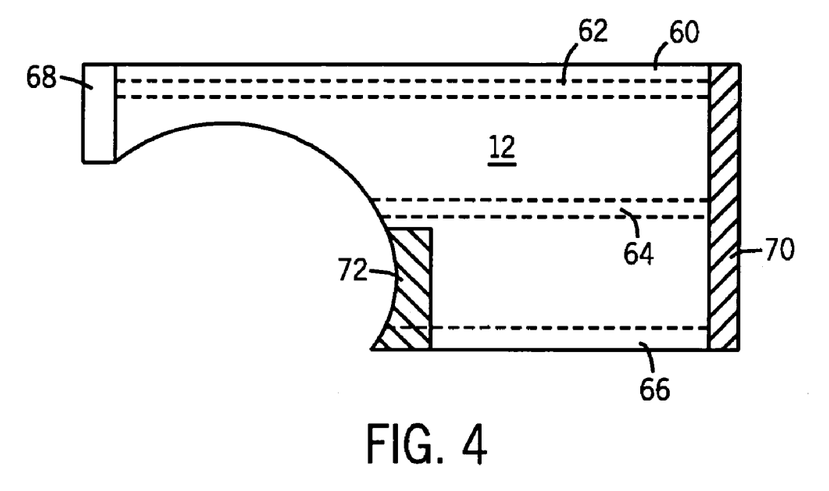
FIG. 4 illustrates the rear quarter body panel with reinforcing filler strips.

Further detail of a finished rear quarter body panel 12 is shown in FIG. 4. The body panel is about 29 by 60 inches, neglecting the wheel well cutout. Filler strips are formed at reinforcement locations 60 and 62 between the first and second patterned fiberglass cloth plies and between the second and third patterned fiberglass cloth plies. Filler strips at locations 60 and 62 provide reinforcement where body panel 12 attaches to deck 26 with fasteners 28. Filler strips are formed at locations 64 and 66 to provide reinforcement where body panel 12 attaches to spring steel rods 22. The filler reinforced areas give extra strength to hold the fastener in place during times of high stress. Filler strips are also formed at location 68 for structural support. The S-Glass uni-directional tape is applied to areas 70 and 72, which are vulnerable to tearing of the fiberglass material during certain collisions having high angles of attack.

Figure 5:
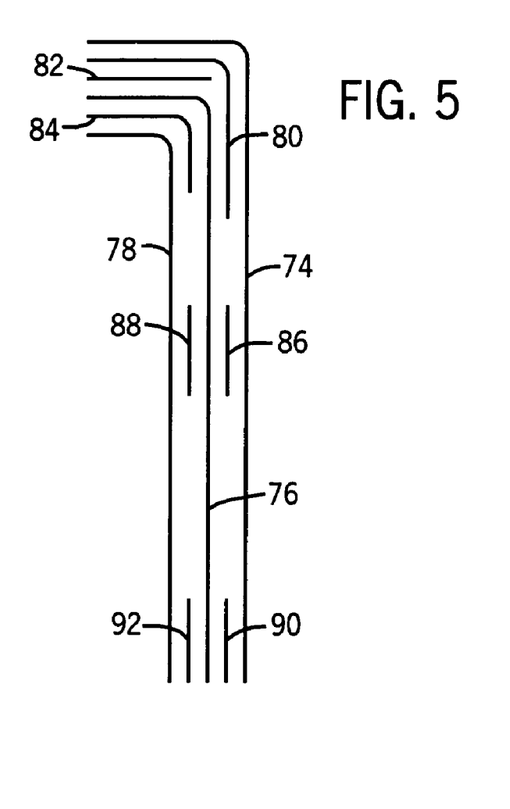
FIG. 5 illustrates a cross-sectional view of the rear quarter body panel with reinforcing filler strips.

A cross-sectional view of body panel 12 is shown in FIG. 5. Filler strips 80, 82, 86, and 90 are formed between fiberglass plies 74 and 76 as shown. Filler strips 84, 88, and 92 are formed between fiberglass plies 76 and 78.

Figure 6:
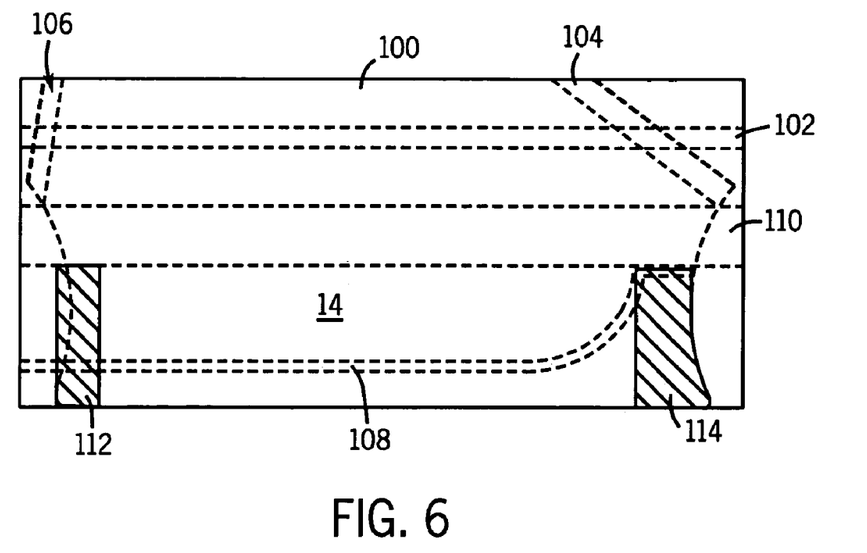
FIG. 6 illustrates the door body panel with reinforcing filler strips.

A finished door body panel 14 is shown in FIG. 6. Filler strips are formed at reinforcing locations 100, 102, 104, and 106 between the first and second patterned fiberglass cloth plies. Filler strips at locations 100-106 provide structural reinforcement for door body panel 14. Filler strips are also formed at locations 108 and 110 for structural support. The S-Glass uni-directional tape is applied to areas 112 and 114, which are vulnerable tearing of the fiberglass material.

Figure 7:
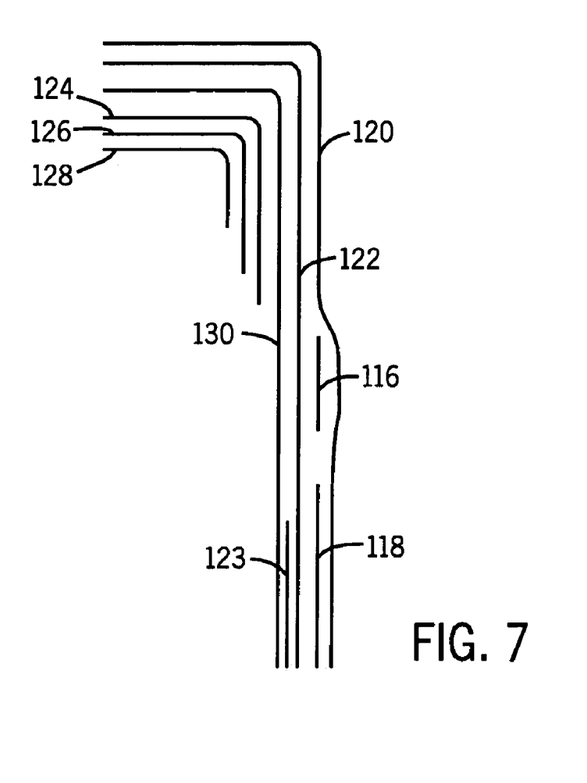
FIG. 7 illustrates a cross-sectional view of the door body panel with reinforcing filler strips.

A cross-sectional view of body panel 14 is shown in FIG. 7. Filler strips 116 and 118 are formed between fiberglass plies 120 and 122 as shown. Filler strip 123 is formed between fiberglass plies 122 and 130. Filler strips 124, 126, and 128 are formed on the outside of fiberglass ply 130.

Figure 8:
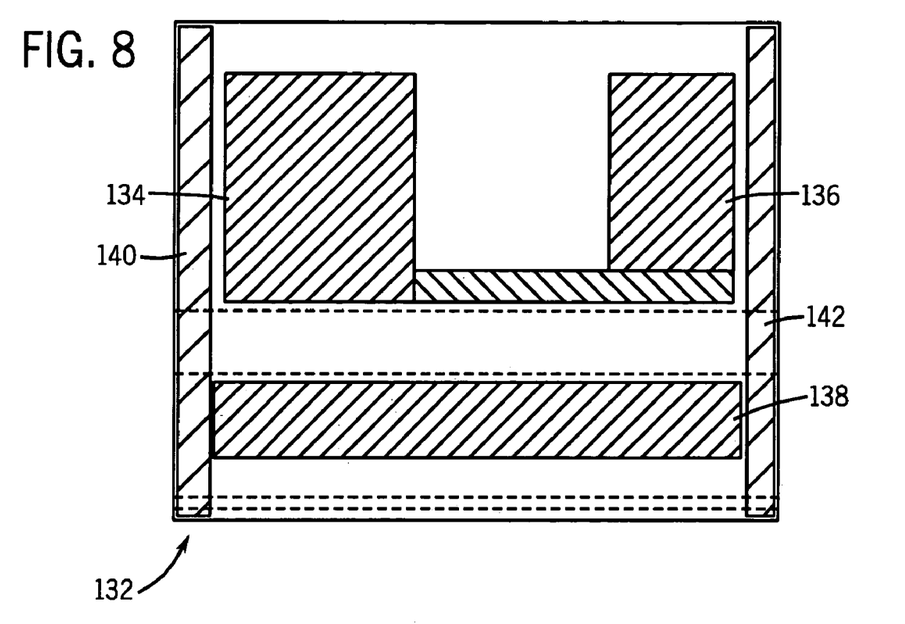
FIG. 8 illustrates another embodiment of the body panel with foam core inserts and reinforcing filler strips.
Figure 9:
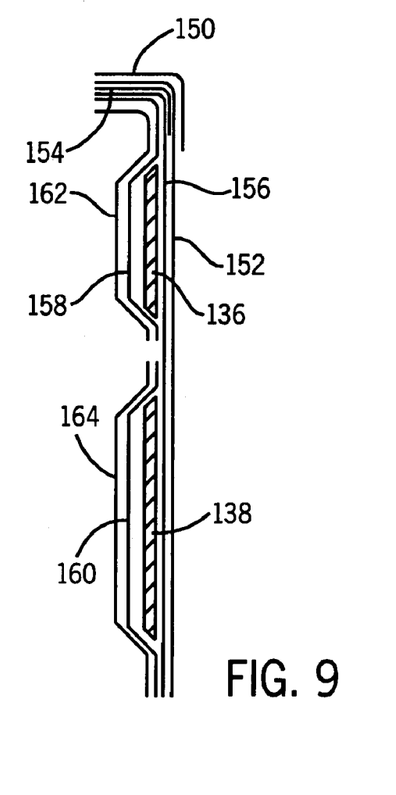
FIG. 9 illustrates a cross-sectional view of the body panel of FIG. 8.

FIG. 8 illustrates another type of body panel having foam core inserts 134, 136, and 138. The S-Glass uni-directional tape is applied to areas 140 and 142, which are vulnerable tearing of the fiberglass material. A cross-sectional view of body panel 132 is shown in FIG. 9. Filler strip 150 is formed on the outside of fiberglass ply 152 as shown. Filler strip 154 is formed between fiberglass plies 152 and 156 as shown. Foam core 136 is formed between fiberglass plies 156 and 158. Foam core 138 is formed between fiberglass plies 156 and 160. Fiberglass plies 162 and 164 are formed to the outside of fiberglass plies 158 and 160, respectively. The foam cores increase stiffness and rigidity for the body panel.

A feature of the pre-impregnated filler reinforced fiberglass body panels is the ability to absorb impact. Upon impact, the fiberglass body panels flex and give. The spring steel rods 22 deflect inward to aid in absorbing the impact. After the impact, the resiliency of the fiberglass material allows the body panel to return to its original shape. The spring steel rods 22 reflex back to normal position. The filler reinforced fiberglass body panel offers significant safety and performance features. Since the filler reinforced fiberglass material absorbs the impact of a collision, the racer is not significantly diverted from its pre-impact course. The driver is not distracted. Even if the collision is severe enough to break off a section of the fiberglass material, the loose piece will not travel as far as metal would have. The fiberglass material quickly looses inertia in flight. The filler reinforced fiberglass body panels are safer for driver and fans alike.

In other embodiments, the molded body panels are applicable to other vehicles which are subject to frequent impact. For example, the molded pre-impregnated fiberglass body panels may be used for fenders of off-road vehicles and motorcycles. The molded body panels can be used for commercial vehicles subject to tough usage such as moving trucks, delivery trucks, and rental units.

The pre-impregnated reinforced fiberglass forms can also be used for high impact applications such as vehicle barriers and hockey sticks.

While one or more embodiments of the present invention have been illustrated in detail, the skilled artisan will appreciate that modifications and adaptations to those embodiments may be made without departing from the scope of the present invention as set forth in the following claims.

What is claimed is:

1. A body panel for a racing vehicle, comprising:
   a first layer of pre-impregnated fiberglass material having a first direction of glass orientation;
   a second layer of pre-impregnated fiberglass material in physical contact with portions of the first layer of pre-impregnated fiberglass material, the second layer of pre-impregnated fiberglass material having a second direction of glass orientation opposite to the first direction of glass orientation;
a first plurality of filler strips disposed between and in physical contact with the first and second layers of pre-impregnated fiberglass material;
a third layer of pre-impregnated fiberglass material in physical contact with portions of the second layer of pre impregnated fiberglass material, the third layer of pre-impregnated fiberglass material having the first direction of glass orientation;
a second plurality of filler strips disposed between and in physical contact with the second and third layers of pre-impregnated fiberglass material; and
a foam core disposed between layers of the pre-impregnated fiberglass material.

2. The body panel of claim 1, further including uni-directional tape applied to portions of a layer of pre-impregnated fiberglass material.

3. The body panel of claim 1, further including spring steel rods for connecting the body panel to the racing vehicle.

4. A molded body panel which is flexible to frequent impact, comprising:
a first layer of pre-impregnated fiberglass material having a first direction of glass orientation;
a second layer of pre-impregnated fiberglass material in physical contact with portions of the first layer of pre-impregnated fiberglass material, the second layer of pre-impregnated fiberglass material having a second direction of glass orientation opposite to the first direction of glass orientation;
a first filler strip disposed between and in physical contact with the first and second layers of pre-impregnated fiberglass material; and
a foam core disposed between layers of the pre-impregnated fiberglass material.

5. The molded body panel of claim 4, further including:
a third layer of pre-impregnated fiberglass material in physical contact with portions of the second layer of pre-impregnated fiberglass material, the third layer of pre-impregnated fiberglass material having the first direction of glass orientation; and
a second filler strip disposed between and in physical contact with the second and third layers of pre-impregnated fiberglass material.

6. A molded body panel which is subject to frequent impact, comprising:
a first layer of pre-impregnated fiberglass material;
a second layer of pre-impregnated fiberglass material in physical contact with portions of the first layer of pre-impregnated fiberglass material;
a first filler layer disposed between and in physical contact with the first and second layers of pre-impregnated fiberglass material; and uni-directional tape applied to portions of a layer of pre-impregnated fiberglass material.

7. The molded body panel of claim 5, further including a foam core disposed between and in physical contact with layers of the pre-impregnated fiberglass material.

8. The molded body panel of claim 4, wherein multiple layers of filler material are disposed between layers of the pre-impregnated fiberglass material.

9. A method of making a flexible body panel, comprising:
forming a first layer of pre-impregnated fiberglass material having a first direction of glass orientation;
forming a second layer of pre-impregnated fiberglass material in physical contact with portions of the first layer of pre-impregnated fiberglass material, the second layer of pre-impregnated fiberglass material having a second direction of glass orientation opposite to the first direction of glass orientation; and
disposing a first filler layer between and in physical contact with the first and second layers of pre-impregnated fiberglass material.

10. The method of claim 9, further including:
forming a third layer of pre-impregnated fiberglass material in physical contact with portions of the second layer of pre-impregnated fiberglass material, the third layer of pre-impregnated fiberglass material having the first direction of glass orientation; and
disposing a second filler layer between and in physical contact with the second and third layers of pre-impregnated fiberglass material.

11. The method of claim 10, further including applying uni-directional tape to portions of a layer of pre-impregnated fiberglass material.

12. The method of claim 10, further including disposing a foam core between and in physical contact with layers of the pre-impregnated fiberglass material.

13. The method of claim 9, further including disposing multiple layers of filler material between layers of the pre-impregnated fiberglass material.

14. The method of claim 9, further including:
enclosing the first and second layers of pre-impregnated fiberglass material with a film canopy;
drawing a vacuum on the film canopy; and
exposing the first and second layers of pre-impregnated fiberglass material to a heat source to cure the flexible body panel.

15. The method of claim 14, wherein the heat source is selected from a group consisting of infrared heat, electric oven, and gas oven.

16. In a racing vehicle having a plurality of molded body panels, at least one of the molded body panels comprising:
a first layer of pre-impregnated fiberglass material having a first direction of glass orientation;
a second layer of pre-impregnated fiberglass material in physical contact with portions of the first layer of pre-impregnated fiberglass material, the second layer of pre-impregnated fiberglass material having a second direction of glass orientation opposite to the first direction of glass orientation; and
a first filler layer disposed between and in physical contact with the first and second layers of pre-impregnated fiberglass material.

17. The molded body panel of claim 16, further including:
a third layer of pre-impregnated fiberglass material in physical contact with portions of the second layer of pre-impregnated fiberglass material, the third layer of pre-impregnated fiberglass material having the first direction of glass orientation; and
a second filler layer disposed between and in physical contact with the second and third layers of pre-impregnated fiberglass material.

18. The molded body panel of claim 17, further including a foam core disposed between and in physical contact with layers of the pre-impregnated fiberglass material.

19. The molded body panel of claim 17, further including uni-directional tape applied to portions of a layer of pre-impregnated fiberglass material.

20. The molded body panel of claim 16, further including spring steel rods connecting the molded body panel to the racing vehicle.

21. A flexible molded body panel, comprising:
   a first layer of pre-impregnated fiberglass material having a first direction of glass orientation;
   a second layer of pre-impregnated fiberglass material having a second direction of glass orientation opposite to the first direction of glass orientation;
   a first filler strip disposed between the first and second layers of fiberglass material; and
   a foam core disposed between the layers of the pre-impregnated fiberglass material.

22. The flexible molded body panel of claim 21, further including:
   a third layer of pre-impregnated fiberglass material having the first direction of glass orientation; and
   a second filler strip disposed between the second and third layers of pre-impregnated fiberglass material.

23. The flexible molded body panel of claim 21, further including uni-directional tape applied to portions of one of the first or second layer of pre-impregnated fiberglass material.

* * * * *